United States Patent Office 3,211,617
Patented Oct. 12, 1965

3,211,617
HEPARINE DERIVATIVES AND PROCESS FOR PREPARATION AND UTILIZATION
Robert Bucourt, Clichy-sous-Bois, France, assignor to Roussel-UCLAF, Paris, France, a corporation of France
No Drawing. Filed July 30, 1964, Ser. No. 386,418
Claims priority, application France, Aug. 7, 1963, 944,034; Sept. 24, 1963, 948,484
14 Claims. (Cl. 167—74)

This invention relates to novel heparine derivatives and more particularly to the O-acetyl-N-monomethyl heparinamide and its alkali metal salts. The invention, in addition, relates to processes for the preparation and the therapeutic utilization of these compounds.

Heparine is known to exercise a clarifying activity on hyperlipemic blood serum but it also possesses a strong anticoagulant activity which prevents its use in the treatment of hyperlipemia. Heparinamides such as O-methyl-N-methyl heparinamide described in United States application Serial No. 345,572, filed February 18, 1964, are known to possess antilipemic activity without any significant anticoagulant activity on oral administration.

It is an object of the invention to provide the novel products, O-acetyl-N-methyl heparinamide and its alkali metal salts.

It is another object of the invention to provide a novel process for the preparation of O-acetyl-N-methyl heparinamide and its alkali metal salts.

It is a further object of the invention to provide novel antilipemic compositions which are substantially devoid of anticoagulant activity.

It is an additional object of the invention to provide a novel method of treating hyperlipemia.

These and other objects and advantages of the invention will become obvious from the following detailed description.

It has now been discovered that O-acetyl-N-monomethyl heparinamide and its alkali metal salts possess furthermore interesting, pharmacological properties.

The novel compounds of the invention are O-acetyl-N-methyl heparinamide and its alkali metal salts which have the probable structural formula (I)

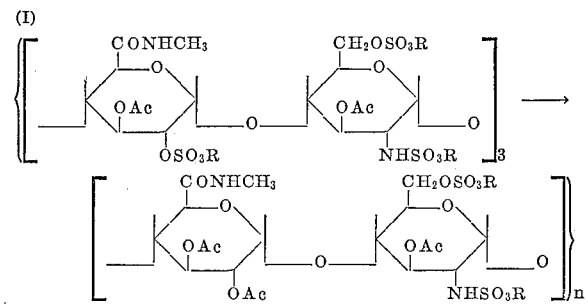

wherein R is selected from the group consisting of hydrogen and an alkali metal, Ac represents the acetyl group and n represents a whole number.

The preferred products are those which are from about 60% to about 100% acetylated.

These products, especially the sodium salt of O-acetyl-N-monomethyl heparinamide, (I; R=sodium), possess in particular a strong antilipemic action and are practically devoid of all anticoagulant activity. This is very valuable in treatments of long duration of hyperlipemia. The products, on the other hand, may be administered orally.

The process for the preparation of these compounds, which is also the subject of the invention, is essentially characterized in that acetic acid anhydride is reacted with N-monomethyl heparinamide in the form of an alkali metal salt; especially the sodium salt.

In the particular case of the preparation of the sodium salt of O-acetyl-N-monomethyl heparinamide, the process of the invention may be summarized in the following reaction flow diagrams:

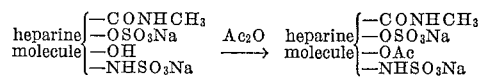

The alkali metal salt of the O-acetyl-N-monomethyl heparinamide obtained may, if desired, be transformed into O-acetyl-N-monomethyl heparinamide (I; R=H) by passing the alkali metal salt in aqueous solution through an ion exchange resin in acid form.

The execution of the process of the invention can be characterized by the following points:

(a) The alkali metal salt of the N-monomethyl heparinamide utilized is preferentially the sodium salt.

(b) The acetylation of the sodium salt of N-monomethyl heparinamide is effected in a mixture of formamide and pyridine.

(c) The process is performed at room temperature.

(d) The process is repeated if necessary in order to obtain a product which is between about 60% and 100% acetylated.

The starting product, the sodium salt of N-monomethyl heparinamide, can be obtained according to the process described in United States patent application Serial No. 117,815, filed June 19, 1961.

This process comprises reacting heparine with a high molecular weight long chain quaternary ammonium compound to form the corresponding quaternary ammonium salt of heparine, reacting the latter with a lower alkyl esterification agent to form a lower alkyl ester of heparine, and reacting the latter with monomethylamine to form N-methyl heparinamide.

In the following example there are described preferred embodiments to illustrate the invention. However, it should be understood that the invention is not intended to be limited to the specific embodiments.

EXAMPLE I.—PREPARATION OF THE SODIUM SALT OF O-ACETYL-N-MONOMETHYL HEPARINAMIDE, (I; R=SODIUM)

2 g. of the sodium salt of N-monomethyl heparinamide (prepared according to application Serial No. 117,815), 30 cc. of formamide, 24 cc. of pyridine and 24 cc. of acetic acid anhydride were introduced into a balloon flask under agitation and stream of nitrogen. The mixture was agitated for a period of 24 hours at room temperature, then 400 cc. of ethanol were added thereto. The mixture was allowed to stand at rest for 1 hour. The precipitate was then filtered, washed first with ethanol, then with ether, and finally dried under vacuum. 2.200 g. of product were thus obtained, which was treated again with the same quantities of reactants and solvents as before.

After agitating the mixture for a period of 24 hours at room temperature, 400 cc. of ethanol were added thereto. The precipitate was filtered, washed first with ethanol, then with ether and finally dried under vacuum. 1.900 g. of the crude sodium salt of O-acetyl-N-monomethyl heparinamide were obtained. The crude salt was dissolved in 7 cc. of water. 1 g. of sodium acetate was added thereto and the mixture was agitated for 30 minutes at room temperature. A small amount of carbon black was added, the mixture was agitated for 15 minutes and filtered through a filter plate. The filter was washed with water. The combined aqueous solutions were added to 150 cc. of ethanol. The precipitate was filtered, washed first with ethanol, then with ether and dried under vacuum. 1.600 g. of the sodium salt of O- acetyl-N-monomethyl heparinamide were obtained in form of a colorless, solid product, soluble in water, dilute aqueous acids and alkalis, slightly soluble in alcohol, and insoluble in ether, acetone, benzene and chloroform.

This product is not described in the literature.

*Analysis.—*

$$(C_{70}H_{95}O_{78}N_8S_{11}Na_{11})_n = (2\ 901.9)_n$$

Amount of acetylation: 15.5% (theory, 18.6%) or 83.5% of the theory.

As it was indicated in the foregoing, O-acetyl-N-monomethyl heparinamide and its alkali metal salts possess interesting pharmacological properties, more particularly a strong antilipemic action.

Antilipemic action: 120 u./mg.

The compounds are practically free of all anticoagulant activity, which fact permits them to be considered for treatments of extensive duration without causing any undesirable secondary effects.

Anticoagulant activity: 2.4 antithrombic units (A.T.U.); 6.25 u./mg. (U.S.P. Method).

O-acetyl-N-monomethyl heparinamide and its alkali metal salts are administered orally, perlingually, transcutaneously or rectally.

These products may be prepared in form of injectable solutions or suspensions, put up in ampoules or in multiple-dose phials; in tablets; coated pills; glossettes; and suppositories. The compositions contain a minor amount of O-acetyl-N-monomethyl heparinamide and its alkali metal salts and a major amount of an inert non-toxic excipient.

The useful dosology is controlled between 20 and 50 mg. per dose and between 1 mg./kg. and 5 mg./kg. per day in the warm-blooded animal as a function of the method of administration. Nevertheless in the case of intravenous administration, the daily dosology may be reduced to about 50 γ/kg.

The pharmaceutical forms, such as injectable solutions or suspensions, tablets, coated pills, glossettes or suppositories, are prepared according to the usual processes.

EXAMPLE II.—PHARMACOLOGICAL STUDY OF O-ACETYL-N-MONOMETHYL HEPARINAMIDE

(1) Action on post-prandial lipemia in dogs (a) *After the administration of the product intravenously.*—An experimental hyperlipemia was induced in dogs by ingestion of 15 g./kg. of cream of fresh milk containing 38% fatty matter. Four and a half hours after this lipidic surcharge, the dogs were separated into two lots. One lot served as control; the other lot received intravenously a dose of 50 γ/kg. of the sodium salt of O-acetyl-N-monomethyl heparinamide, previously dissolved in physiological serum.

Blood samples were taken from all of the animals four and a half hours after the ingestion of fresh cream, immediately before the administration of the product and at 10, 20, 30 and 60 minutes thereafter. The blood samples recovered over an anticoagulating agent were centrifuged. The plasma was separated and the determination of plasmatic turbidity was made on a Vernes photometer and expressed as a percentage in proportion to the initial turbidity, allowing the following of the development of the lipemia.

Table I summarizes the results obtained:

TABLE I

| Dose administered | Plasmatic turbidity as a percent of the initial turbidity | | | | |
|---|---|---|---|---|---|
| | Immediately before | 10 min. after | 20 min. after | 30 min. after | 60 min. after |
| 50 γ/kg | 100 | 64 | 68 | 82 | 106 |

It can be noted that the clarifying effect caused by the sodium salt of O-acetyl-N-monomethyl heparinamide was distinct, with a maximum at 10 and 20 minutes after the injection, effecting decreases of the plasmatic turbidity of 36% and 32%.

(b) *After administration of the product orally.*—A lipidic surcharge was induced in dogs by the ingestion of fresh cream under the same conditions as above. One lot of dogs received only the fresh cream. The other lot received orally a dose of 5 mg./kg. of the sodium salt of O-acetyl-N-monomethyl heparinamide in solution in physiological serum at a concentration of 10 mg./cc., mixed with the 15 g./kg. dose of the cream of fresh milk.

Blood samples were taken immediately prior to the treatment and the administration of cream, as well as 3, 5 and 7 hours afterward. The blood was recovered over an anticoagulating agent, and after centrifugation, the turbidity of the plasma was determined photometrically. The results are summarized in Table II.

TABLE II

| | Dose administered, mg./kg. | Plasmatic turbidity expressed in optical densities | | | |
|---|---|---|---|---|---|
| | | Zero time | 3 hrs. after | 5 hrs. | 7 hrs. |
| Control | 0 | 0.15 | 1.17 | 1.02 | 1.00 |
| Treated | 5 | 0.15 | 0.56 | 0.38 | 0.55 |

The product exerted a distinct clarifying effect which reached its maximum 5 hours after the ingestion, it decreased the turbidity by 62% compared to the controls. The effect was extended through the 7th hour.

(2) Liberation of fatty acids in the rabbit

This test was performed on normal rabbits who received an intravenous injection of 5 mg./kg. of the sodium salt of O-acetyl-N-monomethyl heparinamide in solution in physiological serum.

Blood samples were taken upon sodium citrate solution at a temperature of 0° C., before the treatment and again 30 minutes after. The free fatty acids in the plasma were determined according to the Dole procedure (Dole, J. of Clin. Investig., 1956, 35, 150) and were expressed in milliequivalents of palmitic acid per liter of plasma.

The determinations were made on two specimens of plasma held at a temperature of 0° C., which demonstrated the released fatty acids "in vivo," and for the second specimen after 1, 2, 3 and 5 hours of incubation at a temperature of 37° C., which demonstrated the released fatty acids "in vitro."

The results, obtained with the sodium salt of O-acetyl-N-monomethyl heparinamide and with the heparine, administered at the same dose of 5 mg./kg., are summarized in Table III.

TABLE III

| Products administered | Plasma recovered before the treatment | Plasma recovered 30 min. fter treatment—Incubation time at 37° C. | | | | |
|---|---|---|---|---|---|---|
| | | 0 hr. | 1 hr. | 2 hr. | 3 hr. | 5 hr. |
| Sodium salt of O-acetyl-N-monomethyl heparinamide | 0.36 | 0.64 | 1.11 | 1.38 | 1.61 | 1.81 |
| Heparine | 0.36 | 0.64 | 1.32 | 1.44 | 1.61 | 1.64 |

NOTE.—Amount of free fatty acids expressed in meq./liter of plasma.

It can thus be seen that the action of the sodium salt of O-acetyl-N-monomethyl heparinamide on the liberation of the fatty acids in the rabbit is at least equal to that of heparine.

(b) *Determination of immediate anticoagulating activity "in vitro."* (1) *Antithrombic activity.*—The anticoagulating activity "in vitro" of the sodium salt of O-acetyl-N- mono-methyl heparinamide was determined according to the method described by Herbain (Bull. Soc. Chim. Biol. 1958, 40, 1221). According to this method, a reactant plasma deprived of calcium and prothrombine was prepared and by adding some thrombine to the plasma, the fibrinogen which it contained was transformed into fibrin which produced simultaneously a coagulation and an opacification. The previous addition of an anticoagulant such as heparine provokes a slowing of the coagulation as well as of the opacification. If the time necessary in order to reach a given value of the opacity is measured, it is observed that there exists a relation between this time and the anticoagulating activity of the preparation. The values obtained were compared to those found with a titrated solution of standard heparine and were expressed arbitrarily in antithrombic units (A.T.U.).

Results: A.T.U./mg.
Standard heparine (sodium salt) _____ 130–140
Sodium salt of O-acetyl-N-monomethyl heparinamide _____ 2.4

(2) *Anticoagulating activity according to the method of the U.S. Pharmacopea (U.S.P. XV)*.—The immediate anticoagulating activity "in vitro" of the said sodium salt was determined with reference to heparine which was taken as a reference substance.

Results: U.i./mg.
Standard heparine sodium salt _____ 130–140
Sodium salt of O-acetyl-N-monomethyl heparinamide _____ 6.25

These two determinations clearly show that the anticoagulating effect of the sodium salt of O-acetyl-N-monomethyl heparinamide is practically negligible.

Various modifications of the compositions and process of the invention may be made without departing from the spirit or scope thereof and it is to be understood that the invention is to be limited only as defined in the appended claims.

I claim:
1. A compound selected from the group consisting of O-acetyl-N-monomethyl heparinamide and its alkali metal salts.
2. O-acetyl-N-monomethyl heparinamide.
3. The sodium salt of O-acetyl-N-monomethyl heparinamide.
4. A compound selected from the group consisting of an O-acetylated N-monomethyl heparinamide, which is from about 60% to 100% O-acetylated, and its alkali metal salts.
5. A process for the production of an alkali metal salt of O-acetyl N-monomethyl heparinamide which is about 60 to 100% O-acetylated which comprises reacting the alkali metal salt of N-monomethyl heparinamide with acetic acid anhydride in an organic solvent and recovering an alkali metal salt of O-acetyl N-monomethyl heparinamide.
6. The process of claim 5 wherein said alkali metal salt of N-monomethyl heparinamide is the sodium salt.
7. The process of claim 5 wherein said organic solvent is a mixture of formamide and pyridine.
8. A process for the production of an alkali metal salt of an O-acetylated N-monomethyl heparinamide, which is from about 60% to 100% O-acetylated which comprises the steps of reacting an alkali metal salt of N-monomethyl heparinamide with acetic acid anhydride in the presence of a mixture of formamide and pyridine at about room temperature, repeating said acetylating reaction until said alkali metal salt of an O-acetylated N-monomethyl heparinamide is from about 60% to 100% O-acetylated and recovering said alkali metal salt of an O-acetylated N-monomethyl heparinamide.
9. A process for the production of an O-acetylated N-monomethyl heparinamide which is from about 60% to 100% O-acetylated which comprises the steps of reacting an alkali metal salt of N-monomethyl heparinamide with acetic acid anhydride in the presence of a mixture of formamide and pyridine at about room temperature, repeating said acetylating reaction until said alkali metal salt of an O-acetylated N-monomethyl heparinamide is from about 60% to 100% O-acetylated, passing an aqueous solution of said alkali metal salt of an O-acetylated N-monomethyl heparinamide through an ion exchange resin in acid form, and recovering said O-acetylated N-monomethyl heparinamide.
10. An antilipemic composition comprising a minor amount of a compound selected from the group consisting of an O-acetylated N-monomethyl heparinamide, which is from about 60% to 100% O-acetylated, and its alkali metal salts and a major amount of a pharmacological carrier.
11. The composition of claim 10 wherein said alkali metal salt is the sodium salt.
12. A method of treating hyperlipemia in warm blooded animals which comprises administering to said animals a safe but effective dose of a compound selected from the group consisting of an O-acetylated N-monomethyl heparinamide, which is from about 60% to 100% O-acetyalted, and its alkali metal salts.
13. The method of claim 12 wherein said alkali metal salt is the sodium salt.
14. The method of claim 12 wherein said dose is from 1 mg./kg. to 5 mg./kg. per day.

No references cited.

JULIAN S. LEVITT, *Primary Examiner.*